US007536714B2

(12) United States Patent  (10) Patent No.: US 7,536,714 B2
Yuan                      (45) Date of Patent:     May 19, 2009

(54) SYSTEM AND METHOD FOR SYNCHRONIZING LOGIN PROCESSES

(75) Inventor: Sheue Yuan, Moorestown, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 773 days.

(21) Appl. No.: 10/819,012

(22) Filed: Apr. 6, 2004

(65) Prior Publication Data

US 2005/0010824 A1    Jan. 13, 2005

Related U.S. Application Data

(60) Provisional application No. 60/486,598, filed on Jul. 11, 2003.

(51) Int. Cl.
  *G06F 7/04*     (2006.01)
  *H04W 4/00*     (2009.01)
(52) U.S. Cl. ............... 726/7; 455/432.1; 455/436; 726/21; 715/795
(58) Field of Classification Search .............. 713/168
  See application file for complete search history.

(56) References Cited

U.S. PATENT DOCUMENTS

| 6,269,395 | B1 * | 7/2001 | Blatherwick et al. | ........ | 709/219 |
| 6,412,073 | B1 | 6/2002 | Rangan | | |
| 6,421,768 | B1 | 7/2002 | Purpura | | |
| 6,594,766 | B2 | 7/2003 | Rangan et al. | | |
| 6,701,368 | B1 * | 3/2004 | Chennapragada et al. | ... | 709/228 |

(Continued)

FOREIGN PATENT DOCUMENTS

| EP | 0 573 248 A1 | 12/1993 |
| EP | 0 940 960 A1 | 9/1999 |
| WO | WO 01/55819 A1 | 8/2001 |
| WO | WO 02/39237 A2 | 5/2002 |

OTHER PUBLICATIONS

Notification of Transmittal of the International Search Report and the Written Opinion of the International Searching Authority, or the Declaration—Form PCT/ISA/220 (3 pages); PCT International Search Report—Form PCT/ISA/210 (4 pages), and Written Opinion of the International Searching Authority—Form PCT/ISA/237 (7 pages), PCT/US2004/022045, mailed Nov. 17, 2004.

(Continued)

*Primary Examiner*—Christian LaForgia
(74) *Attorney, Agent, or Firm*—Pillsbury Winthrop Shaw Pittman LLP

(57) ABSTRACT

In certain embodiments, a method for synchronizing login processes in a web environment includes receiving user authentication information for a particular one of a plurality of access points, each access point operable to provide a user system that submitted the user authentication information access to one or more target items. The method includes authenticating the user authentication information to determine whether the user system associated with the user authentication information is authorized to access the one or more target items associated with the particular access point. The method includes initiating a successful login to the particular access point if it is determined that the user system associated with the user authentication information is authorized to access the one or more target items and automatically propagating the successful login to the particular access point to one or more of the other access points based at least on the successful login to the particular access point.

26 Claims, 6 Drawing Sheets

U.S. PATENT DOCUMENTS

| | | | |
|---|---|---|---|
| 6,970,434 B1* | 11/2005 | Mahany et al. | 370/256 |
| 7,263,357 B2* | 8/2007 | Lee et al. | 455/432.1 |
| 7,275,157 B2* | 9/2007 | Cam Winget | 713/168 |
| 2002/0194508 A1 | 12/2002 | Sanchez et al. | |
| 2003/0002482 A1* | 1/2003 | Kubler et al. | 370/352 |
| 2003/0084287 A1* | 5/2003 | Wang et al. | 713/168 |
| 2003/0115267 A1 | 6/2003 | Hinton et al. | |
| 2004/0242228 A1* | 12/2004 | Lee et al. | 455/432.1 |
| 2005/0117524 A1* | 6/2005 | Lee et al. | 370/254 |
| 2005/0254475 A1* | 11/2005 | Kubler et al. | 370/338 |
| 2007/0177584 A1* | 8/2007 | Kubler et al. | 370/352 |

OTHER PUBLICATIONS

"Installing Documentum Portlets on Windows NT," *Documentum, Inc.*, Version 4.5 (28 pp.), Mar. 2002.

"Integrating Documentum Portlets Into Portals," *Documentum, Inc.*, Version: Draft 0.4 (52 pp.), Mar. 2002.

"Documentum Portal Integration Pack™ Release Notes," *Documentum, Inc.*, Version 4.5a (21 pp.), Aug. 2002.

"Using Documentum Portlets," *Documentum, Inc.*, Version 4.5 (135 pp.), Jun. 2002.

\* cited by examiner

US 7,536,714 B2

SYSTEM AND METHOD FOR SYNCHRONIZING LOGIN PROCESSES

RELATED APPLICATION

This application claims the priority under 35 U.S.C. §119 of provisional application Ser. No. 60/486,598 filed Jul. 11, 2003.

TECHNICAL FIELD

This disclosure relates generally to the field of web communication and more specifically to a system and method for synchronizing login process.

BACKGROUND

Users in a web-based or other network environment are often required to enter user authentication information to access certain information, verify the user's identity, access information associated with the user, access user preferences associated with the user, and for other purposes. As an example, a user may be required to login to an access point that may be displayed in a web browser associated with the user. The access point may be one of a plurality of access points in the same or in additional web browsers. For example, a portal environment may include a plurality of portlets each serving as an access point. Each access point may require the user to enter user authentication information to access information associated with the access point.

SUMMARY

This disclosure provides a system and method for synchronizing login processes.

In certain embodiments, a method for synchronizing login processes in a web environment includes receiving user authentication information for a particular one of a plurality of access points, each access point operable to provide a user system that submitted the user authentication information access to one or more target items. The method includes authenticating the user authentication information to determine whether the user system associated with the user authentication information is authorized to access the one or more target items associated with the particular access point. The method includes initiating a successful login to the particular access point if it is determined that the user system associated with the user authentication information is authorized to access the one or more target items and automatically propagating the successful login to the particular access point to one or more of the other access points based at least on the successful login to the particular access point.

BRIEF DESCRIPTION OF THE DRAWINGS

For a more complete understanding of the present disclosure and its advantages, reference is now made to the following descriptions, taken in conjunction with the accompanying drawings, in which.

DESCRIPTION OF EXAMPLE EMBODIMENTS

Figure 1:
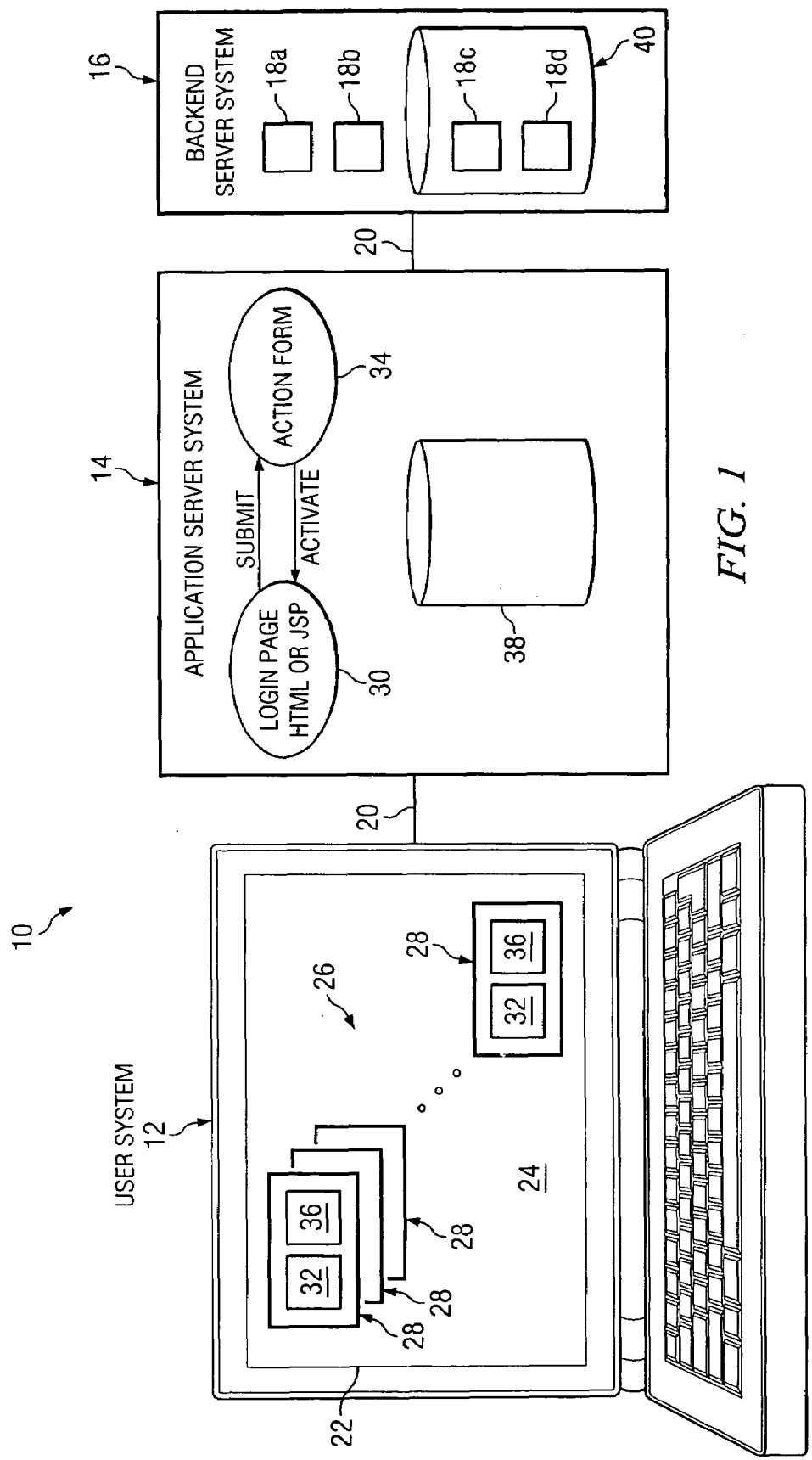
FIG. 1 illustrates an example system for synchronizing login processes.

FIG. 1 illustrates an example system 10 for synchronizing login processes. In certain embodiments, system 10 includes one or more user systems 12, an application server system 14, and a backend server system 16. Although a particular implementation of system 10 is illustrated and described, the present disclosure contemplates system 10 including any suitable configuration, according to particular needs or desires. In general, system 10 enables a user system 12 to login to multiple access points such as one or more portlets in a portal environment by logging into at least one access point. In certain embodiments, the present disclosure may provide the ability to handle multiple instances of portlets having a same login form, such as a JAVA SERVER PAGE (JSP) running on application server system 14, to log into backend server system 16. In this example embodiment, a synchronization mechanism automatically logs into backend server system 16 and brings up the next available web page for one or more other portlets when a first portlet has a valid login process to connect to backend server system 16.

The term "automatically" as used herein generally means that the appropriate processing is substantially performed by system 10. It should be understood, however, that "automatically" further contemplates any suitable user interaction with system 10. Additionally, the term "each" as used throughout this disclosure means every one of at least a subset. Furthermore, the term "synchronized" or "synchronization" as used throughout the present disclosure should not be interpreted to require exact synchronization for all embodiments. As just one example, certain processing delays may be associated with the synchronization of login processes.

In certain embodiments, this synchronization mechanism may operate for any generic web browser such as, for example, MICROSOFT INTERNET EXPLORER, NETSCAPE browser, or any other suitable web browser according to particular needs. While the present disclosure discusses portals and portlets, the present disclosure contemplates user system 12 logging into multiple access points of any suitable type by logging onto at least one other access point.

User systems 12 may access target items 18 associated with backend server system 16 via application server system 14. Although a single user system 12 is illustrated, the present disclosure contemplates system 10 including any suitable number of user systems 12, according to particular needs. Each user system 12 may include input devices, output devices, mass storage media, processors, memory, interfaces, communication ports, or other appropriate components for interacting with application server system 14 and/or backend server system 16. As used in this disclosure, user system 12 is intended to encompass a personal computer, workstation, network computer, kiosk, wireless data port, personal digital assistant (PDA), one or more processors within these or other devices, or any other suitable processing device. For example, user system 12 may include a computer that includes an input device, such as keypad, touch screen, mouse, or other device that can accept information, and an output device that conveys information associated with the operation of user system 12, application server system 14, and backend server system 16, including digital data, visual information, or other suitable information. Both the input device and output device may include fixed or removable storage media such as a magnetic computer disk, CD-ROM, or other suitable media to both receive input from and provide output to users of user systems 12 through a portion of a web interface. In certain embodiments, user systems 12 include HyperText Markup Language (HTML) pages and applets running in browsers, JAVA applications, and other applications that interoperate with JAVA. Moreover, "user system 12" and "user of user system 12" may be used interchangeably without departing from the scope of this disclosure.

Each user system 12 may include one or more browsers 22, such as MICROSOFT INTERNET EXPLORER, NETSCAPE NAVIGATOR, or any other suitable browser. In certain embodiments, browser 22 need not be an Internet browser but may include any suitable network browser. In addition, the term "web" as used throughout the present disclosure contemplates any suitable network environment. Using a browser 22, user system 12 may access target items 18 associated with backend server 16 using a workspace window 24. In certain embodiments, workspace window 24 is a portal 24, which may be described as a portal container. Throughout the remainder of this disclosure, workspace window 24 will be referred to as a portal 24; however, it should be understood that the present disclosure contemplates any suitable workspace window according to particular needs. In certain embodiments, portal 24 includes a single web-based access point for delivery of applications, services, and content, such as target items 18, to user system 12. Portal 24 may provide user system 12 with a common interface to view, implement, report on, analyze, monitor, and automate system functions for many different system technologies (e.g., storage, security, network control, etc.), and across different platforms. Portal 24 may be displayed within browser 22, as a separate window (e.g., a workplace window), or in any other suitable manner according to particular needs.

Portal 24 may include a plurality of access points 26 such as portlets 26 for providing a user access to target items 18 associated with backend server system 16. Throughout the remainder of this disclosure, access points 26 will be referred to as portlets 26; however, it should be understood that the present disclosure contemplates any suitable access points 26 according to particular needs. While portlets 26 are described primarily as being included in portal 24, the present disclosure contemplates portlets 26 being independent of a portal 24. Portlets 26 may be displayed as one or more windows within portal 24, as separate windows not bound by a single exterior portal 24, or in any other suitable manner according to particular needs. Portlets 26 may be associated with application server system 14, backend server system 16, or any other suitable server system according to particular needs. In certain embodiments, portlets 26 may be servlet-based portlets 26. In one example embodiment, portlets 26 include Cabinets, Inbox, MyDocuments, MyFolder, MySubscriptions, MyWorkarea, MyWorkflows, Search, or any other suitable portlets 26 and provide enterprise content management services to user systems 12. These portlets 26 are provided merely as examples and are not meant in a limiting sense.

To gain access to portlets 26, a user of user system 12 may be required to enter user authentication information and that user authentication information may be authenticated to determine if the user of user system 12 is authorized to access portlets 26. User authentication information may include a user ID, a password, a domain name, or any other suitable user authentication information according to particular needs. In certain embodiments, a user of user system 12 may be required to complete a login form 28 (e.g., with the user authentication information) to gain access to portlets 26 and ultimately, to gain access to target data 18 associated with a corresponding portlet 26. Login form 28 may be associated with a login page 30, which may be a JAVA SERVER PAGE (JSP) or hypertext markup language (HTML) page running on a different application server such as application server system 14. In certain embodiments, multiple login forms 28 on user system 12 may be associated with a single login page 30 on application server system 14.

In certain embodiments, the present disclosure provides a system and method for synchronizing login processes among a plurality of portlets 26. In certain embodiments, each login form 28 may be associated with a target backend server connection indicator 32. For example, target backend server connection indicator 32 may include an identification of a backend server 16 that the user is attempting to access via the portlet 26 associated with the login form 28. In certain embodiments, the user of user system 12 may be able to select target backend server system 16 for each portlet 26 in the plurality of portlets 26. In this embodiment, the user may select the same backend server 16 for one or more of portlets 26. In certain embodiments, the login forms 28 associated with a single portal 24 may automatically have the same target backend server connection indicator 32, which may or may not be altered by a user of user system 12 or other authorized person. In certain embodiments, target backend server connection indicator 32 may include an address, such as a URL for example, of the backend server system 16.

User system 12 may communicate with application server system 14 using link 20. Link 20 facilitates wireless or wireline communications between application server system 14 and any other computer such as user systems 12. Link 20 may communicate, for example, Internet Protocol (IP) packets, Frame Relay frames, Asynchronous Transfer Mode (ATM) cells, voice, video, data, and other suitable information between network addresses. Link 20 may include one or more local area networks (LANs), metropolitan area networks (MANs), wide area networks (WANs), all or a portion of a global network such as the Internet, or any other communication systems at one or more locations. Link 20 may support HTML communication, hypertext transfer protocol (HTTP) communication, or any other suitable communication according to particular needs.

Application server system 14 may include a web application server. In certain embodiments, application server system 14 includes a portal server system operable to provide a user, who has submitted the proper user authentication information, access to target data 18 via portlets 26, such as may be associated with backend server system 16. In certain embodiments, application server system 14 is remote from user system 12. Application server system 14 and backend server system 16 may be a part of a single server system or different server systems, according to particular needs. Thus, in certain embodiments, reference to application server system 14 may include backend server system 16 and reference to backend server system 16 may include application server system 14. Each server system (application server system 14 and backend server system 16) may include one or more application servers, one or more web application servers, one or more databases or other data storage means, one or more servlets, or any other suitable components. Furthermore, although the present disclosure only describes user systems 12, application server system 14, and backend server system 16, the present disclosure contemplates system 10 including any other suitable intervening servers, according to particular needs.

Application server system 14 may include a login page 30 that corresponds to one or more login forms 28 displayed on browser 22. Although a single login page 30 is illustrated, the present disclosure contemplates application server system 14 including any suitable number of login pages 30, each corresponding to any suitable number of login forms 28 on a user system 12. In certain embodiments, login page 30 includes a JSP or HTML page, although the present disclosure contemplates login page 30 being any suitable format according to particular needs. As the user inputs user authentication information into a login form 28 that corresponds to login page 30, the user authentication information may also be associated with login page 30. In certain embodiments, the target backend server connection indicator 32 associated with login form 28 may be stored as cookies for the login page 30, for example. While the present disclosure describes storing the target backend server connection indicator 32 primarily as cookies for the login page 30, the present disclosure contemplates storing the target backend server connection indicator 32 in any suitable manner such that it is associated with the login page 30 or the login form 28.

In certain embodiments, when a user submits a completed login form 28 (i.e. that includes user authentication information), by clicking a "submit" or other suitable button for example, the login page 30 associated with the login form 28 is submitted to an action form 34. In certain embodiments, action form 34 includes a JSP or HTML page, although the present disclosure contemplates action form 34 being any suitable format, according to particular needs. Action form 34 may include an action form for authenticating the user authentication information. While the present disclosure describes a particular method for authenticating the user authentication information, the present disclosure contemplates authenticating the user authentication information in any suitable manner according to particular needs. As examples, user authentication information is authenticated using an WINDOWS NT LanMan (NTLM) authentication scheme, an eTrust Single Sign-on authentication scheme developed by COMPUTER ASSOCIATES INTERNATIONAL, INC., or any other suitable scheme according to particular needs.

In certain embodiments, the user authentication information of login page 30 is submitted to an action form 34. Action form 34 may also include an authentication page, and action form 34 may be used to verify the user authentication information. Action form 34 or another suitable component of application server system 14 determines whether the authentication of the user authentication information was successful. In certain embodiments, application server system 14 uses action form 34 and the user authentication information submitted to action form 34 to determine the identity of the user and, if applicable to verify the user's identity through the use of a password or other suitable information.

Although the present disclosure primarily describes the use of a user ID and password to authenticate the identity of the user, the user's identity may be authenticated in any suitable manner, according to particular needs. Furthermore, although authentication of user authentication information is described primarily as being performed on application server system 14, the present disclosure contemplates authentication of user authentication information being performed on any suitable component of system 10 (e.g., on backend server system 16), according to particular needs. For example, authentication of user authentication information may include communicating the user authentication information from application server system 14 to backend server system 16 for authentication. However, in certain embodiments, passing user authentication information from application server system 14 to backend server system 16 may compromise the security of system 10 and may be undesirable.

If the authentication of the user authentication information is determined to be unsuccessful, action form 34 or another suitable component of application server system 14 may initiate communication of a notification to the user system 12 that the login attempt failed. For example, action form 34 may initiate a refresh of the portlet 26 on browser 22 of user system 12 such that the portlet 26 contains a login form 28 that does not include any user-entered user authentication information. If the authentication of the user authentication information is determined to be successful, action form 34 or another suitable component of application server system 14 may initiate propagation of the successful login to other login forms 28. For example, action form 34 may initiate propagation of the successful login to one or more other login forms 28 on user system 12.

Although a particular method for performing the propagation of the successful login is described below, the present disclosure contemplates propagating the successful login in any suitable manner, according to particular needs. In certain embodiments, one or more of the login forms 28 displayed on user system 12 may include a hidden form element 36 or other suitable flag. The present disclosure contemplates storing hidden form element 36 in any suitable manner such that it is associated with the login form 28 and/or login page 30. Hidden form element 36 indicates whether a successful login has occurred for either the portlet 26 associated with the login form 28 being processed or for one or more other portlets 26 associated with other instances of login form 28. As an example, hidden form element 36 may initially be set to FALSE or some other suitable value indicating that a successful login attempt has not been performed for a login form 28 associated with the hidden form element 36. After a successful login has occurred for a login form 28 associated with the login page 30, the hidden form element 36 may be set to TRUE.

Action form 34 may determine whether the value of hidden form element 36 is set to TRUE or FALSE. For example, action form 34 may determine whether the value of hidden form element 36 is set to TRUE or FALSE before authenticating the user authentication information. While certain operations are described as being performed by action form 34, the present disclosure contemplates these operations being performed by any suitable component of system 10, including one or more processors associated with application server system 14. In certain embodiments, a value for hidden form element 36 of FALSE may indicate that user authentication information has riot been successfully authenticated for that login form 28, and a value for hidden form element 36 of TRUE may indicate that user authentication information has been successfully authenticated for the at least one login form 28 associated with the login page 30. Although the values "TRUE" and "FALSE" are described, the present disclosure contemplates the use of any suitable values, such as "1" and "0" for example.

If action form 34 determines that the value of hidden form element 36 of the login form 28 is FALSE, then action form 34 may initiate storage of target backend server connection indicator 32 for the login form 28. For example, the target backend server connection indicator 32 may include an identification of the target backend server 16 with which the portlet 26 is associated. In certain embodiments, the target backend server connection indicator 32 is stored as cookies for login page 30 associated with the login form 28. The document cookies may be stored on user system 12, application server system 14, or in any other suitable location according to particular needs. The cookies may be set by user system 12, by application server system 14, or in any other suitable manner and may be passed between user system 12 and application server system 14, as HTTP headers for example.

In certain embodiments, if action form 34 or another suitable component of application server system 14 determines that the value of hidden form element 36 is TRUE, then action form 34 may determine whether the target backend server connection indicator 32 for the login form 28 being processed matches the target backend server connection indicator 32 previously stored as cookies for the login page 30. In certain embodiments, it may be desirable to make this determination because user system 12 may attempt to access a number of portlets 26 (e.g., within a portal 24). Each portlet 26 may be associated with a different backend server 16, and each backend server 16 may be associated with its own set of users who have the appropriate permissions for accessing portlets 26 associated with the backend server system 16. Thus, a successful login to one backend server system 16 may not necessarily mean that a user has privileges to access a portlet 26 associated with another backend server 16.

If action form 34 or another suitable component of application server system 14 determines that the target backend server connection indicator 32 for the login form 28 being processed does not match the target backend server connection indicator 32 for the login page 30, then action form 34 may look for other instances of login forms 28 on user system 12 having the hidden form element 36. If action form 34 or another suitable component of application server system 14 determines that the target backend server connection indicator 32 for the login form 28 being processed matches the target backend server connection indicator 32 for the login page 30, then action form 34 or another suitable component of system 10 may authenticate the user authentication information associated with the login form 28 being processed as described above.

If authentication of the user authentication information is determined to be successful, then the application server system 14 may grant the user access to the target data 18 associated with the portlet 26 for which the user submitted the user authentication information. For example, application server system 14 may display a next page for the portlet 26. Action form 34 or another suitable component of application server system 14 may determine whether there is another instance of the login form 28 associated with the login page 30 that has the hidden form element 36. For example, action form 34 may search within a portal 24 associated with the portlet 26 to which the user was granted access for another portlet 26 associated with the login page 30 that has a login form 28 having the hidden form element 36. If action form 34 finds such a login form 28, then action form 34 sets the hidden form element 36 of the found login form 28 to TRUE. Action form 34 may automatically submit the found login form 28 along with the same user authentication information that the user submitted for the portlet 26 to which the user was granted access. Action form 34 may then process the found login form 28 in a similar manner as described above. In certain embodiments, action form 34 repeats the above-described process until all found login forms 28 on user system 12 have been processed.

In certain embodiments, application server system 14 maintains a runtime cookie hash table or other suitable structure. The runtime cookie hash table may be used to synchronize portlets 26 having the same user authentication information. In certain embodiments, the runtime cookie has table is operable to store user authentication information as user cookies. For example, after a first connection is established, the user cookies may be cached in the hash table that is used for any following connections to other portlets 26. In certain embodiments, a user ID may be used as an index to fetch user authentication information from the hash table.

Application server system 14 may include or be coupled to a memory 38. In certain embodiments, memory 38 may be used to store the target backend server connection indicator 32 associated with the login form 30 of a portlet 26 for which a successful login occurs. Memory 38 may store any other suitable information according to particular needs. Memory 38 may include any suitable type of memory according to particular needs. In certain embodiments, memory 38 includes a cache.

Backend server system 16 may include one or more target items 18 or any other suitable data to which user system 12 is attempting to gain access. In certain embodiments, backend server system 16 provides the one or more portlets 26. In certain embodiments, application server system 14 and backend server system 16 may each be a part of the same server system or may be a single server. Furthermore, although a single backend server system 16 is illustrated, the present disclosure contemplates system 10 including any suitable number of backend server systems according to particular needs. In certain embodiments, backend server system 16 includes or is coupled to a database 40 or other suitable memory. Database 40 may include one or more target items 18 or any other suitable data to which user system 12 is attempting to gain access. Although described as a database, database 40 may be more broadly referred to as an information server, which includes database 40 or other suitable information components such as spreadsheets or flat files.

Reference to "database 40" is meant to include "information server," and reference to "databases 40" is meant to include other suitable information components. Although only one database 40 is shown, system 10 may include any suitable number and types of databases 40, according to particular needs. Database 40 may store and facilitate retrieval of information used by applications user systems 12 or backend server 16. Database 40 may include any hardware, software, firmware, or combination thereof operable to store and facilitate retrieval of information. Also, database 40 may use any of a variety of data structures, arrangements, and compilations to store and facilitate retrieval of information. Target items 18 may include services 18*a*, applications 18*b*, information 18*c*, user preferences 18*d*, or any other suitable items.

The one or more user systems 12, application server system 14, and backend server system 16 may each include one or more computers at one or more locations and may share data storage, communications, or other resources according to particular needs. For example, functionality described in connection with user system 12, application server system 14, and backend server system 16 may be provided using a single computer system, which in a particular embodiment might include a conventional desktop or laptop computer. Furthermore, functionality described in connection with user system 12, application server system 14, and backend server system 16 may be provided using any suitable software components. The one or more user systems 12 may interact with application server system 14 and backend server system 16 according to suitable input from any number of associated users.

In operation of an example embodiment of system 10, a user of user system 12 may request access to one of a plurality of portlets 26. A login form 28 may be displayed to the user, requesting that the user enter user authentication information to access the portlet 26, and, in certain embodiments, the backend server system 16 associated with the portlet 26. For example, the login form 28 may include one or more requests for the user to enter user authentication information to verify the user's identity, such as a user name, password, domain name, or any other suitable information according to particular needs. In the example in which the user accesses a portal 24 and a portal container is displayed in the user's browser 22, the portal container including the plurality of portlets 26, each portlet 26 may be displayed with a login form 28. In another embodiment, only a single login form 28 is displayed on user system 12. Because this is the first of the plurality of portlets 26 for which user system 12 has attempted a login, the hidden form element 36 associated with the login form 28 may initially be set to FALSE or some other suitable value indicating that a successful login attempt has not been performed. In certain embodiments, login form 28 includes a target backend server connection indicator 32 identifying the backend server system 16 associated with the portlet 26.

The user of user system 12 may enter user authentication information into login form 28. The user may submit login page 30 corresponding to login form 28 to an action form 34 on application server system 14, by clicking on a "submit" or similar button on login form 28 for example. Action form 34 or another suitable component of application server system 14 may determine whether the value of the hidden form element 36 for the login form 28 is set to TRUE. If the value of the hidden form element of the login form 28 is determined to be FALSE, then action form 34 or another suitable component of application server system 14 may initiate storage of a target backend server connection indicator 32 for the login form 28. In certain embodiments, the target backend server connection indicator 32 is stored as cookies for login page 30. The document cookies may be stored on user system 12, application server system 14, or in any other suitable location according to particular needs.

If action form 34 determines that the value of the hidden form element 36 is TRUE, then action form 34 may determine whether the target backend server connection indicator 32 for the login form 28 being processed matches the target backend server connection indicator 32 for login page 30. If application server system 14 determines that the target backend server connection indicator 32 for the login form 28 being processed does not match the target backend server connection indicator 32 for login page 30, then action form 34 may look for other instances of login forms 28 on user system 12 having a hidden form element 36 or may simply maintain the display of the login form 28. If action form 34 determines that the target backend server connection indicator 32 for the login form 28 being processed matches the target backend server connection indicator 32 for login page 30, then action form 34 authenticates the user login information using action form 34. In certain embodiments, the user authentication information of login page 32 is submitted to action form 34, which, in certain embodiments, includes a JSP or HTML page. Action form 34 authenticates the user authentication information and determines whether the authentication of the user authentication information was successful.

If authentication of the user authentication information is determined to be unsuccessful, then action form 34 or another suitable component of application server system 14 may initiate communication of a notification to the user system 12 that attempted the login that the login attempt was unsuccessful. If authentication of the user authentication information is determined to be successful, then action form 34 or another suitable component of application server system 14 may grant the user access to the target data 18 associated with the portlet 26 for which the user submitted the user authentication information. For example, application server system 14 may display a next page for the portlet 26. If the authentication of the user authentication information is determined to be successful, action form 34 or another suitable component of application server system 14 may automatically initiate propagation of the successful login to other login forms 28 displayed on user system 12. For example, action form 34 may initiate propagation of the successful login to one or more other login forms 28 on user system 12.

In certain embodiments, to perform the propagation of the successful login attempt, action form 34 may determine whether there is another instance of login form 28 associated with login page 30 that has the hidden form element 36. For example, action form 34 may search within a portal 24 associated with the portlet 26 to which the user was granted access for another portlet 26 associated with login page 30 that has a login form 28 having the hidden form element 36. If action form 34 finds such a login form 28, then action form 34 sets the hidden form element 36 of the found login form 28 to TRUE. In certain embodiments, action form 34 automatically submits the found login form 28 along with the same user authentication information that the user submitted for the portlet 26 to which the user was granted access. In other embodiments, action form 34 automatically grants the user associated with the found login form 28 access to the access point 26 associated with the found login form 28 rather than re-authenticating the user authentication information. In certain embodiments, action form 34 repeats the above-described process until all found login forms 28 on user system 12 have been processed.

In certain embodiments, the present disclosure may reduce or eliminate the need to reenter user authentication information (i.e., to login) for each of a plurality of portlets 26 or other web-based access points 26. For example, the present disclosure may reduce or eliminate the need for a user of a user system to login to each portlet 26 individually. This may ease the burden on the user when accessing and navigating the portlets 26. Although described as synchronizing login processes, in certain embodiments, the present disclosure does not require all logins to occur at exactly the same time. As just one example, certain processing delays may be associated with automatically propagating a successful login to one or more other portlets 26.

Figure 2:
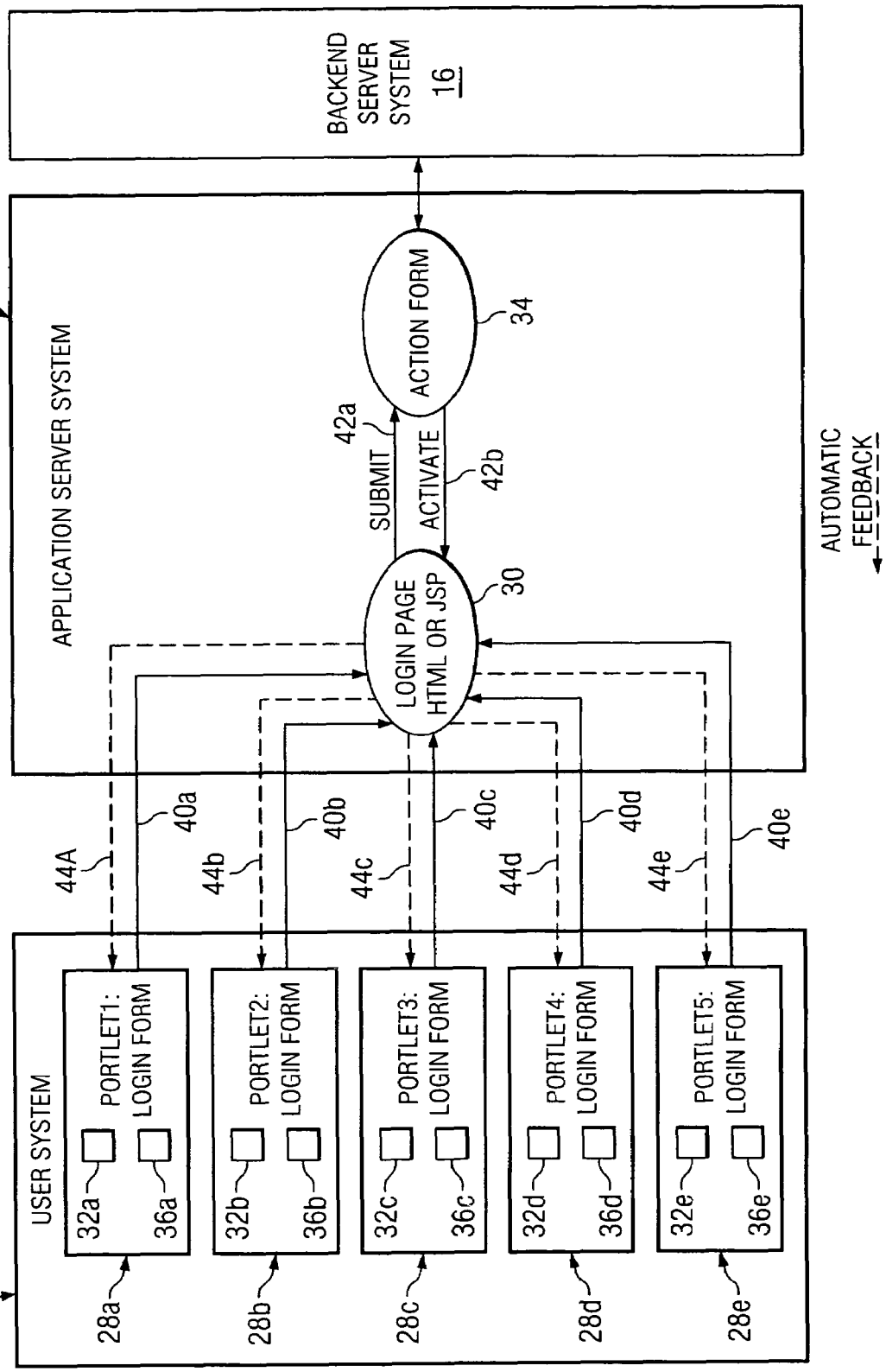
FIG. 2 illustrates another representation of an example system for synchronizing login processes.

FIG. 2 illustrates another representation of an example system 10 for synchronizing login processes. In certain embodiments, certain components of system 10 illustrated in FIG. 2 may be substantially similar to corresponding components described above with reference to FIG. 1. In the example embodiment illustrated in FIG. 2, login forms 28a, 28b, 28c, 28d, and 28e on user system 12 correspond to a login page 30 on application server system 14. Although a particular number of login forms 28 are illustrated, the present disclosure contemplates any suitable number of login forms 28.

As can be seen in the example embodiment illustrated in FIG. 2, a user may enter user authentication information into login form 28a and submit the user authentication information using, by clicking on a "submit" or other suitable button for example, as shown on submit path 40a. This submit action may also cause login page 30 to be submitted to an action form 34 as shown by path 42a. Assuming action form 34 successfully authenticates the user authentication information submitted for login form 28a, action form 34 may grant user system 12 access to the portlet 26 corresponding to login form 28a, as shown by paths 42b and 44a. Action form 34 may then automatically propagate the successful login associated with login form 28a to other suitable login forms 28 (i.e. login forms 28b, 28c, 28d, and 28e) on user system 12 as described above with reference to FIG. 1. Paths 40b and 44b illustrate the automatic submission and grant of access for login form 28b, paths 40c and 44c illustrate the automatic submission and grant of access for login form 28*c*, paths 40*d* and 44*d* illustrate the automatic submission and grant of access for login form 28*d*, and paths 40*e* and 44*e* illustrate the automatic submission and grant of access for login form 28*e*.

Figure 3A:
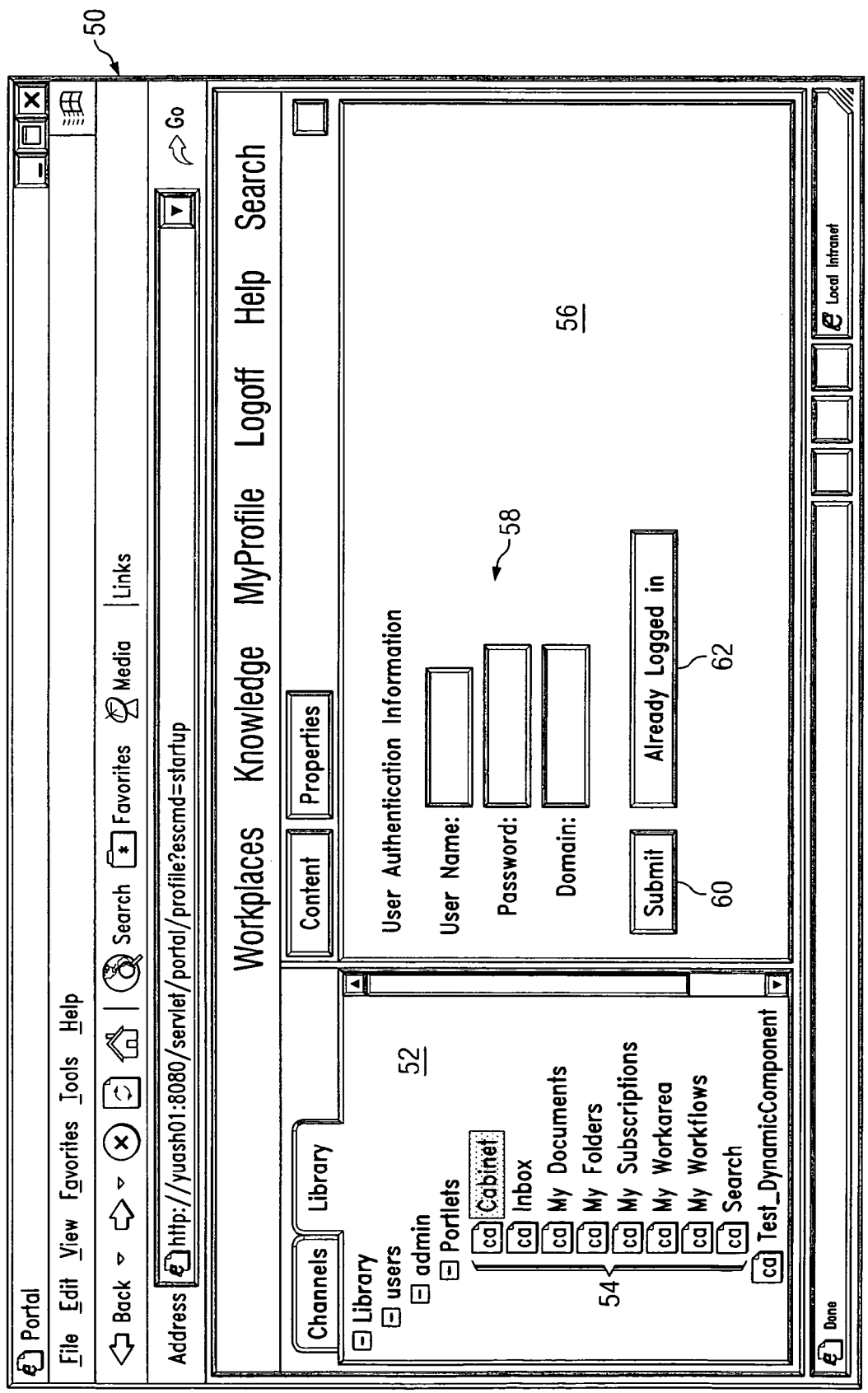
FIGS. 3A through 3C are exemplary block diagrams illustrating an example display that may be used to provide synchronization of login processes according to certain embodiments of this disclosure.
Figure 3B:
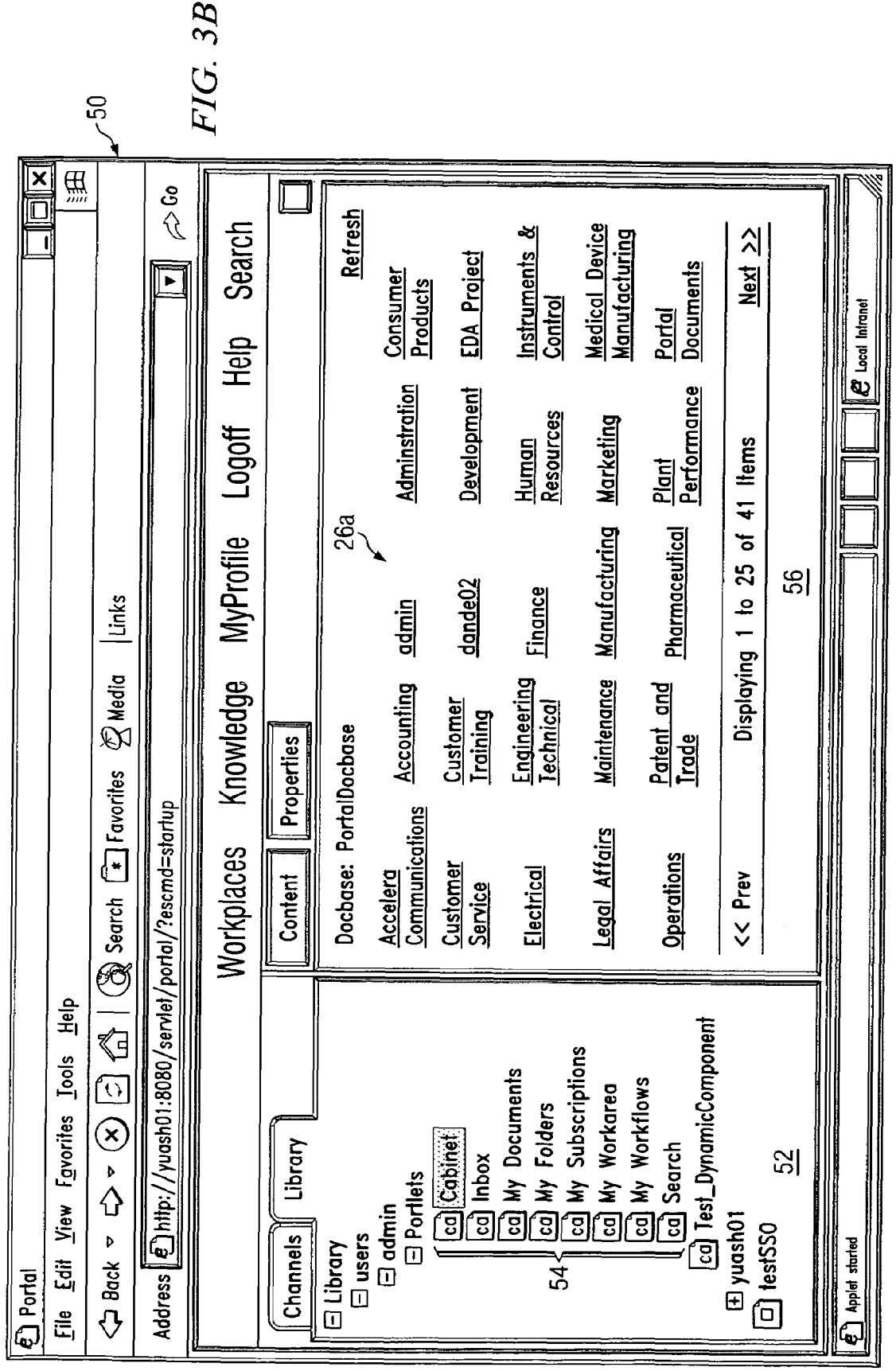
Figure 3C:
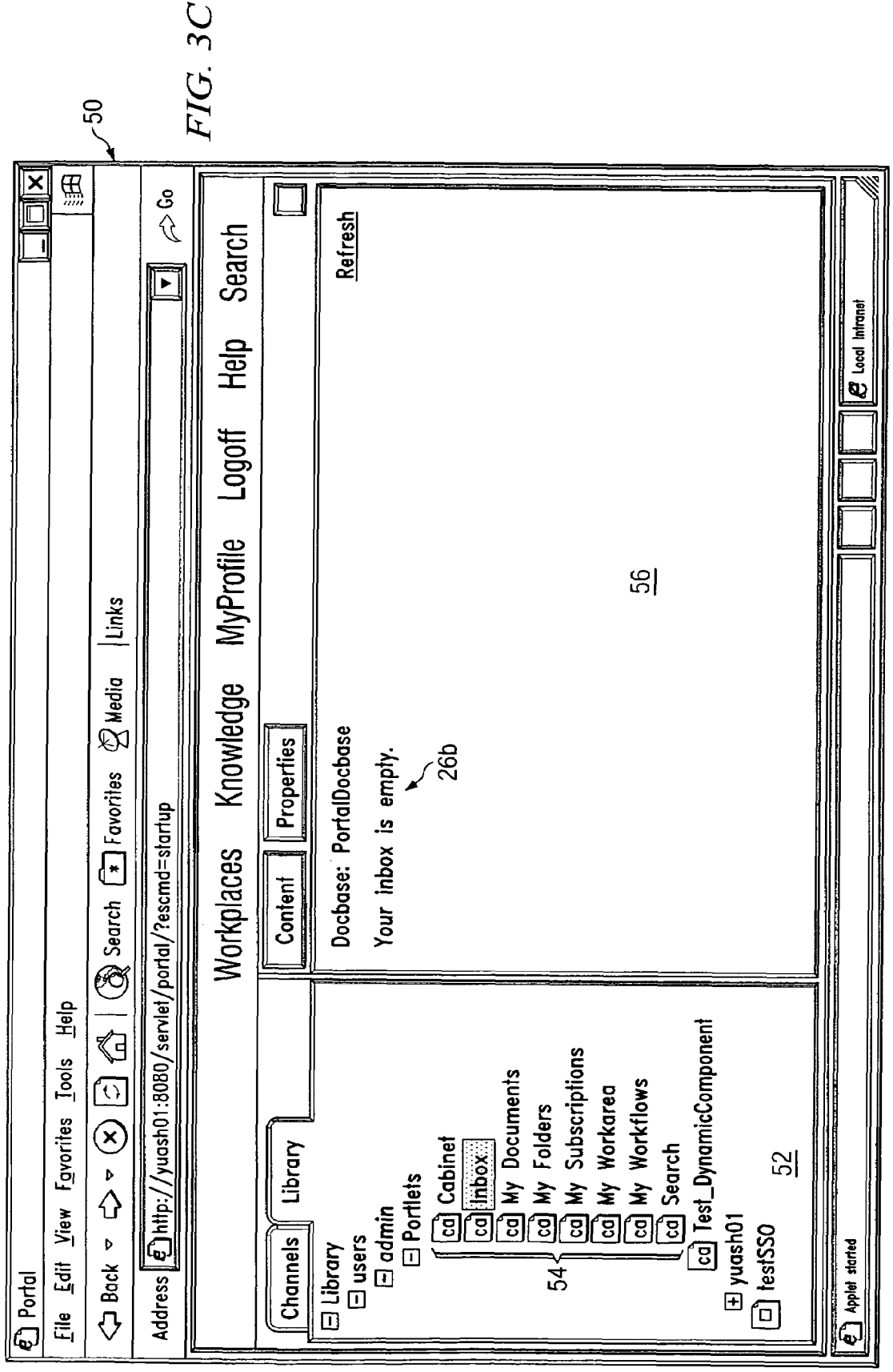

FIGS. 3A through 3C are exemplary block diagrams illustrating an example display that may be used to provide synchronization of login processes according to certain embodiments of this disclosure. In particular, FIGS. 3A through 3C illustrate example web pages displayed by a web browser. The web pages illustrated in FIGS. 3A through 3C could, for example, be generated by application server system 14 and displayed by browser 22 of user system 12. The web pages in FIGS. 3A through 3C are for illustration only. Other web pages could be used in system 10. Also, while the web pages may be described as being generated by and used in system 10 of FIG. 1, the web pages could be generated and used by any other suitable system.

As illustrate in FIG. 3A, a window 50 (e.g., a portal 24) may include a panel 52, which may be a web page or in any other suitable format. Panel 52 may include a hierarchical list, which may include a list of one or more portlet identifiers 54, each identifying a portlet 26 for example. A user (of user system 12 for example) may select a portlet identifier 54 (e.g., Cabinet), which may correspond to a particular portlet 26 (e.g., the Cabinet portlet 26). In response, a login screen may be displayed in a panel 56 of window 50, requesting the user to enter user authentication information 58 to gain access to the portlet 26 corresponding to the portlet identifier 54. Panel 56 may be a web page or in any other suitable format. The user may enter user authentication information 58 and select a submit button 60. In certain embodiments, the user may select an "already logged in" button 62, to inform the appropriate server (e.g., application server system 14) that the user has already logged in successfully.

As illustrated in FIG. 3B, assuming a user has entered the appropriate user authentication information 58 and selected the submit button 60, and that the user authentication information 58 submitted by the user was appropriately processed to determine that the user is authorized to access the Cabinet portlet 26, the user may be granted access to the Cabinets portlet 26. For example, the Cabinets portlet 26*a* may be displayed in panel 56 of window 50.

As illustrated in FIG. 3C, according to the present invention, once a user has successfully entered user authentication information 58 for one of the portlets 26 (e.g., the Cabinet portlet 26*a*) associated with a portlet identifier 54, the successful login is propagated to one or more of the other portlets 26 associated with the other portlet identifiers 54 without being required to reenter user authentication information 58 for each of the other portlets 26. Thus, as illustrated in FIG. 3C, for example, the user may be able to select a portlet identifier 54 (e.g., Inbox) corresponding to another portlet 26 (e.g., the Inbox portlet 26*b*), and the Inbox portlet 26*b* may be displayed in panel 56 of window 50 without the user being required to reenter user authentication information 58. In certain embodiments, a user may be able to access those other portlets 26 that are associated with the same target backend server 16 as the portlet 26 for which the user authentication information was entered and successfully authenticated.

Although FIGS. 3A through 3C illustrate example embodiments of a display used in system 10, various changes may be made to FIGS. 3A through 3C. For example, the web page shown in FIGS. 3A through 3C is for illustration only. Other web pages or displays having other contents and arrangements may be used. Also, the web pages displayed to the user could include other or additional features and are not limited to the content shown in FIGS. 3A through 3C.

Figure 4:
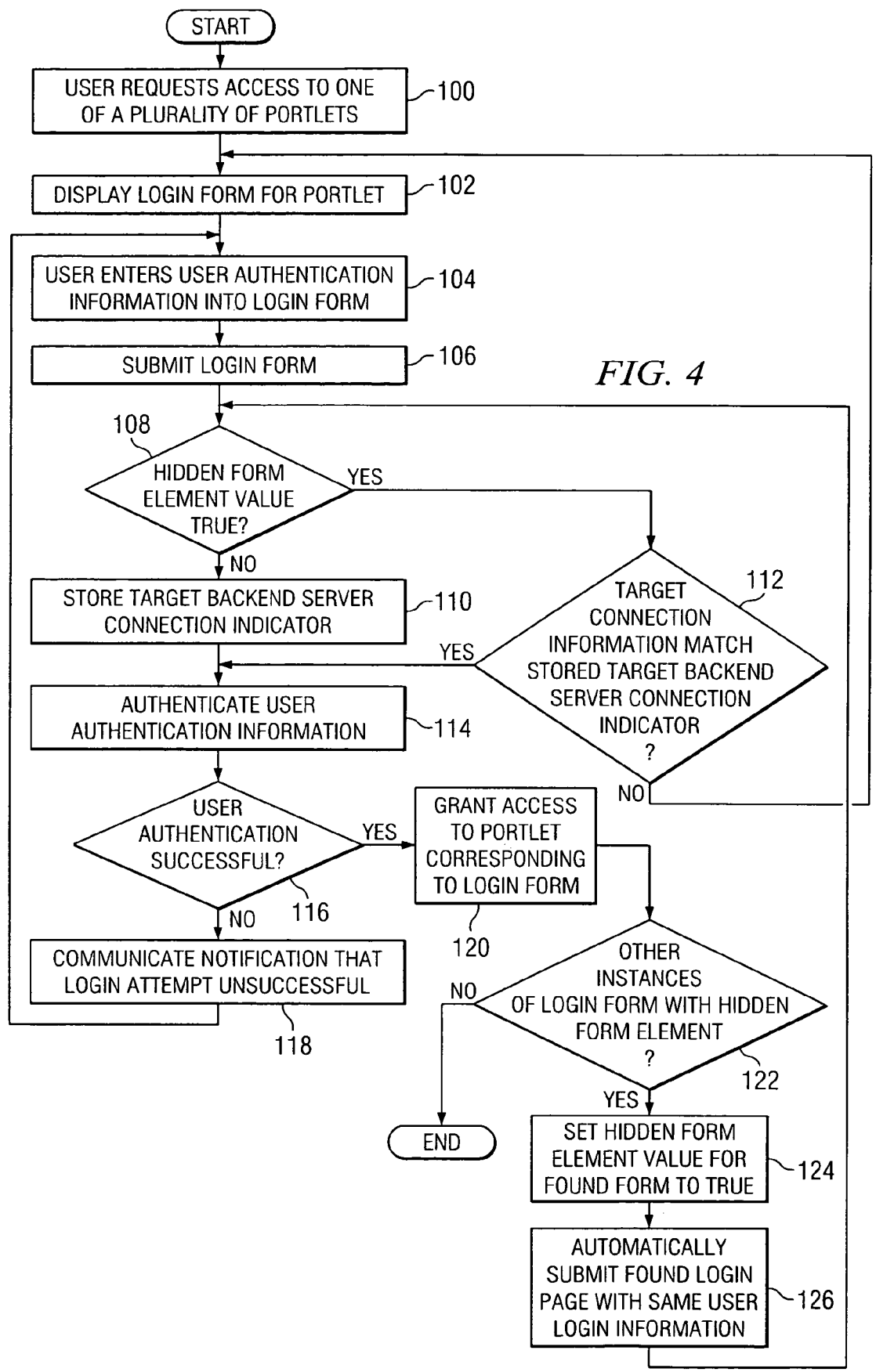
FIG. 4 illustrates an example method for synchronizing login processes.

FIG. 4 illustrates an example method for synchronizing login processes. At step 100, a user of user system 12 requests access to one of a plurality of portlets 26. In certain embodiments, portlets 26 may be a part of a larger portal 24, such as may be displayed in a portal container on a browser of user system 12. For example, the user may access the portal 24, and a portal container may be displayed in the user's browser 22, the portal container including the plurality of portlets 26. The portlet 26 may be associated with a predetermined backend server 16 or the user may specify a particular backend server 16 with which the portlet 26 is to be associated. While described as a user of user system 12 requesting access, it should be understood that a user system 12 may automatically perform various steps of the method.

At step 102, a login form 28 may be displayed to the user, requesting that the user enter user authentication information to access the portlet 26, and thus the backend server system 16 associated with the portlet 26. For example, the login form 28 may include one or more requests for the user to enter user authentication information to verify the user's identity, such as a user name, password, domain name, or any other suitable information according to particular needs. In the example in which the user accesses a portal 24 and a portal container is displayed in the user's browser 22, the portal container including the plurality of portlets 26, each portlet 26 may be displayed with a login form 28. For example, the user may request access to portal 24 and login forms 28 for each portlet 26 may be automatically displayed to the user.

Each login form 28 may be associated with a login page 30 on application server system 14. In certain embodiments, login page 30 includes a JSP or HTML page on application server system 14. Each login form 28 may be associated with a hidden form element 36 or other suitable flag that indicates whether a successful login has occurred for the portlet 26 associated with the login form 28. Because this is the first of the plurality of portlets 26 for which user system 12 has attempted a login, the hidden form element 36 may initially be set to FALSE or some other suitable value indicating that a successful login attempt has not been performed. In certain embodiments, login form 28 may include a target backend server connection indicator 32 identifying the backend server system 16 associated with the portlet 26. In certain embodiments, the user of user system 12 may be able to select target backend server system 16 for each portlet 26 in the plurality of portlets 26. In this embodiment, the user may select the same backend server 16 for one or more of portlets 26. The target backend server connection indicator 32 may also be stored as cookies for login page 30, for example. In certain embodiments, the target backend server connection indicator 32 may includes an address, such as a URL for example, of the backend server system 16.

At step 104, the user of user system 12 may enter user authentication information into login form 28. In certain embodiments, user system 12 enters the user authentication information automatically without requiring user action. At step 106, the user may submit login page 30 corresponding to login form 28 to an action form 34 on application server system 14, by clicking on a "submit" or similar button on login form 28 for example. In certain embodiments, action form 34 is an authentication page, which may be a JSP document, an HTML page, or any other suitable data format on application server system 14. At step 108, action form 34 or another suitable component of application server system 14 automatically determines whether the hidden form element 36 value for the login form 28 is set to TRUE. For example, this may help determine whether other instances of login forms 28 have experienced a successful authentication for this login session. If the hidden form element 36 value of the login form 28 is determined to be FALSE at step 108, then application server system 108 may automatically initiate storage of target backend server connection indicator 32 for the login page 30 at step 110. For example, the connection information may include the target backend server connection indicator 32 of the target backend server 16 with which the portlet 26 is associated. In certain embodiments, the target backend server connection indicator 32 is stored as cookies for the login page 30. The document cookies may be stored on user system 12, application server system 14, or in any other suitable location according to particular needs. The cookies may be set by user system 12, by application server system 14, or in any other suitable manner and may be passed between user system 12 and application server system 14, as HTTP headers for example. The method then proceeds to step 112 described below.

Returning to step 108, if application server system 14 determines that the hidden form element 36 value is TRUE, then application server system 14 automatically determines at step 112 whether the target backend server connection indicator 32 for the login form 28 being processed matches the target backend server connection indicator 32 for login page 30. If application server system 14 determines at step 112 that the target backend server connection indicator 32 for the login form 28 being processed does not match the target backend server connection indicator 32 for login page 30, then the method returns to step 102 to display the login form 28. If application server system 14 determines at step 112 that the target backend server connection indicator 32 for the login form 28 being processed matches the target backend server connection indicator 32 for login page 30 then in certain embodiments, the method proceeds to step 114. In other embodiments, the method proceeds directly to step 120 if it is determined at step 112 that the target backend server connection indicator 32 for the login form 28 being processed matches the target backend server indicator 32 for login page 30.

At step 114, application server system 14 automatically authenticates the user login information using action form 34. In certain embodiments, the user authentication information of login page 32 is submitted to action form 34, which, in certain embodiments, includes a JSP or HTML page. Action form 34 may be used to verify the user authentication information. At step 116, application server system 14 automatically determines whether the authentication of the user authentication information was successful. In certain embodiments, application server system 14 uses action form 34 and the user authentication information submitted to action form 34 to automatically determine the identity of the user and, if applicable to verify the user's identity through the use of a password.

Although the present disclosure primarily describes the use of a user ID and password to authenticate the identity of the user, the user's identity may be authenticated in any suitable manner, according to particular needs. Furthermore, although authentication of user authentication information is described primarily as being performed on application server system 14, the present disclosure contemplates authentication of user authentication information being performed on any suitable component of system 10 (e.g., on backend server system 16), according to particular needs, on backend server 16. For example, authentication of user authentication information may include communicating the user authentication information from application server system 14 to backend server system 16 for authentication. However, in certain embodiments, passing user authentication information from application server system 14 to backend server system 16 may compromise the security of system 10.

Application server system 14 may determine whether the user has the appropriate privileges to access the requested information on backend server 16 via the corresponding portlet 26. In certain embodiments, authentication of the user may include determining one or more user preferences based on the user's identity. Authentication of user authentication information may include determining whether the user authentication information is correct (e.g., the correct password is given for a valid user ID), whether the user associated with the user authentication information has the proper credentials to access the portal 26 and/or the target backend server system 16 associated with the portal 26, or any other suitable verifications according to particular needs.

If authentication of the user authentication information is determined to be unsuccessful at step 116, then at step 118, application server system 14 automatically communicates a notification to the user system 12 that attempted the login that the login attempt was unsuccessful. For example, application server system 14 may automatically redirect the user system 12 that attempted the login to the login form 28, using a refresh display operation for example. The method then returns to step 104 to wait for the user to enter new login information or to terminate the login attempts. If authentication of the user authentication information is determined to be successful at step 116, then the application server system 14 may automatically grant the user access to the target data 18 associated with the portlet 26 for which the user submitted the user authentication information. For example, application server system 14 may automatically display a next page for the portlet 26.

At step 122, action form 34 automatically determines whether there is another instance of login form 28 associated with login page 30 that has the hidden form element 36. For example, action form 34 may search within a portal 24 associated with the portlet 26 to which the user was granted access at step 120 for another portlet 26 associated with login page 30 that has a login form 28 having the hidden form element 36. If action form 34 does not find any such login forms 28 at step 122, then the method ends. If action form 34 finds such a login form 28 at step 122, then action form 34 automatically sets the hidden form element 36 of the found login form 28 to TRUE at step 124. At step 126, action form 34 automatically submits the found login form 28 along with the same user authentication information that the user submitted for the portlet 26 to which the user was granted access at step 120. In certain embodiments, method then returns to step 108. In other embodiments, the method may return directly to step 112 rather than determining whether the hidden form element value is set to TRUE, and in these embodiments if it is determined at step 112 that the target backend server connection indicator 32 of the found login form 28 is the same as the target backend server connection indicator 32 for login page 30, then the user authentication steps (e.g., steps 114 and 116) may be skipped, the user automatically being granted access at step 120.

In certain embodiments, step 122 and the steps that follow step 122 may be automatically repeated until the user is logged into all login forms 28 associated with login page 30 that have the hidden form element 36. In certain embodiments, steps 122-126 may be referred to as automatically propagating the successful login to other login forms 28 having the hidden form element 36, although propagating the successful login may include other steps. In certain embodiments, this may allow the user to be logged into all portlets 26 that have a substantially similar login form 28 and that have the same target backend server 16. Furthermore, although this method has been described for propagating a successful login to other login forms 28, the present disclosure contemplates performing this synchronization in any suitable manner according to particular needs or desires.

Although a particular method for synchronizing login processes has been described with reference to FIG. 4, the present disclosure contemplates any suitable method for synchronizing login processes in accordance with the present disclosure. Thus, certain of the steps described with reference to FIG. 4 may take place simultaneously and/or in different orders than as shown. As just one example, step 120 may be performed for all of the successful logins in substantially one step. Moreover, system 10 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for synchronizing login processes in a web environment, comprising:
receiving user authentication information for a particular one of a plurality of access points, each access point operable to provide a user system that submitted the user authentication information access to one or more target items;
authenticating the user authentication information to determine whether the user system associated with the user authentication information is authorized to access the one or more target items associated with the particular access point;
initiating a successful login to the particular access point if it is determined that the user system associated with the user authentication information is authorized to access the one or more target items; and
automatically propagating the successful login to the particular access point to one or more of the other access points, through the user system and hidden from an end user, based at least on the successful login to the particular access point.

2. The method of claim 1, further comprising, for each of the plurality of access points, displaying a login form for receiving the user authentication information, the login form being associated with a corresponding login page on an application server system in communication with the user system.

3. The method of claim 2, wherein one or more of the login forms each comprise a corresponding hidden form element indicating whether a successful login has occurred for an access point associated with another login form and wherein automatically propagating the successful login through the user system comprises:
searching the user system for one or more login forms other than the login form associated with the particular access point for which a successful login was initiated; and
for each found login form:
determining whether the login form comprises a corresponding hidden form element; and
if the found login form comprises the corresponding hidden form element, setting the corresponding hidden form element to TRUE and automatically submitting the found login form with the user authentication information.

4. The method of claim 3, further comprising authenticating the user authentication information associated with the found login form that was automatically submitted to determine whether the user system is authorized to access the one or more target items associated with the access point associated with the login form.

5. The method of claim 3, wherein the corresponding hidden form element for the login form associated with the particular access point is initially set to FALSE.

6. The method of claim 2, wherein the one or more target items for each access point are associated with a backend server system, the login form for each access point comprising a target backend server connection indicator indicating the target backend server associated with the one or more target items of the access point.

7. The method of claim 6, further comprising:
for the login form associated with the particular access point, storing the target backend server connection indicator;
propagating the successful login comprising:
searching the user system for one or more login forms other than the login form associated with the particular access point for which a successful login was initiated; and
for each found login form:
determining whether the target backend server connection indicator for the found login form matches the stored target backend server connection indicator for the login form associated with the particular access point; and
if a match is determined, automatically submitting the found login form with the user authentication information.

8. The method of claim 7, further comprising authenticating the user authentication information associated with the found login form that was automatically submitted to determine whether the user system is authorized to access the one or more target items associated with the access point associated with the login form.

9. The method of claim 7, further comprising storing the target backend server connection indicator of the login form for the particular access point as cookies for the login page associated with the login form for the particular access point.

10. The method of claim 2, wherein the login page comprises at least one of an embedded script document and an HTML page running on the application server system in communication with the user system.

11. The method of claim 1, wherein each access point comprises a portlet.

12. The method of claim 1, wherein the user authentication information comprises at least one of:
a user name identifying a user of the user system;
a password; and
a domain name.

13. A system for synchronizing login processes in a web environment, comprising:
a memory; and
an application server system comprising an action form, the action form operable to:
receive, from a login page, user authentication information for a particular one of a plurality of access points, each access point operable to provide a user system that submitted the user authentication information access to one or more target items;

authenticate the user authentication information to determine whether the user system associated with the user authentication information is authorized to access the one or more target items associated with the particular access point;

initiate a successful login to the particular access point if it is determined that the user system associated with the user authentication information is authorized to access the one or more target items; and automatically propagate the successful login to the particular access point to one or more of the other access points, through the user system and hidden from an end user, based at least on the successful login to the particular access point.

14. The system of claim 13, wherein the application server system is operable to, for each of the plurality of access points, display a login form for receiving the user authentication information, the login form being associated with the login page on the application server system in communication with the user system.

15. The system of claim 14, wherein one or more of the login forms each comprise a corresponding hidden form element indicating whether a successful login has occurred for an access point associated with another login form, the action form operable to propagate the successful login through the user system by:

searching the user system for one or more login forms other than the login form associated with the particular access point for which a successful login was initiated; and for each found login form:
  determining whether the login form comprises a corresponding hidden form element; and
  if the found login form comprises the corresponding hidden form element, setting the corresponding hidden form element to TRUE and automatically submitting the found login form with the user authentication information.

16. The system of claim 15, wherein the action form is further operable to authenticate the user authentication information associated with the found login form that was automatically submitted to determine whether the user system is authorized to access the one or more target items associated with the access point associated with the login form.

17. The system of claim 14, wherein the corresponding hidden form element for the login form associated with the particular access point is initially set to FALSE.

18. The system of claim 14, wherein the one or more target items for each access point are associated with a backend server system, the login form for each access point comprising a target backend server connection indicator indicating the target backend server associated with the one or more target items of the access point.

19. The system of claim 18, wherein the action form is further operable to:

for the login form associated with the particular access point, store the target backend server connection indicator in the memory; and propagate the successful login by:
  searching the user system for one or more login forms other than the login form associated with the particular access point to which the user system was granted access; and
  for each found login form:
    determining whether the target backend server connection indicator for the found login form matches the stored target backend server connection indicator for the login form associated with the particular access point; and
    if a match is determined, automatically submitting the found login form with the user authentication information.

20. The system of claim 19, wherein the action form is further operable to authenticate the user authentication information associated with the found login form that was automatically submitted to determine whether the user system is authorized to access the one or more target items associated with the access point associated with the login form.

21. The system of claim 19, wherein the action form is further operable to store the target backend server connection indicator of the login form for the particular access point as cookies for the login page associated with the login form for the particular access point.

22. The system of claim 14, wherein the login page comprises at least one of an embedded script document and an HTML page running on the application server system in communication with the user system.

23. The system of claim 13, wherein each access point comprises a portlet.

24. The system of claim 13, wherein the user authentication information comprises at least one of:
  a user name identifying a user of the user system;
  a password;
  and a domain name.

25. The system of claim 13, wherein the application server system comprises the memory.

26. A method for synchronizing login processes in a web environment, comprising:

in response to receiving user authentication information for a particular one of a plurality of access points, initiating a successful login to the particular access point if it is determined based on authentication of the user authentication information that a user system associated with user authentication information is authorized to access one or more target items associated with the particular access point; and automatically propagating the successful login to the particular access point to one or more of the other access points, through the user system and hidden from an end user, based at least on the successful login to the particular access point.

* * * * *